United States Patent Office 2,929,685
Patented Mar. 22, 1960

2,929,685

METHOD FOR MAKING TITANIUM BORIDE FROM PHOSPHATES

Leif Aagaard, Plainfield, and Helmut Espenschied, Metuchen, N.J., assignors to National Lead Company, New York, N.Y., a corporation of New Jersey No Drawing. Application July 10, 1953
Serial No. 367,360

2 Claims. (Cl. 23—204)

The present invention relates in general to refractory metal compounds and more particularly to titanium compounds of boron, and to an improved method for making the same.

Heretofore, refractory metal compounds of carbon, boron, zirconium and the like, sometimes referred to hereinafter as metalloids, have been prepared with a modicum of success by heating dry mixtures of a refractory metal oxide, such as for example calcined titanium dioxide or zirconium oxide, carbon and/or an oxidic compound of boron, to form the refractory metal compound. However, prior methods have had to contend with the problem of obtaining intimate and permanent contact between the inherently coarse metal oxide particles, and the carbon particles which, due to their fineness, tend to separate out from the mixture during reaction. In attempting to overcome this difficulty, prior technicians have resorted to pelletizing the mixtures and then heating the pellets at temperatures from 2000° C. to 2500° C. The resulting product is a hard sintered mass of material which must be subsequently broken up into smaller particles and ground. However, such products can be ground mechanically to form a finely divided powder only with great difficulty due to the abrasiveness and hardness of the compositions. Hence, even the ground material is relatively coarse, the smallest particle size being about 80 microns. Moreover, the purity and toughness of this product is often impaired by a high percentage of graphite which is formed from the carbon at the high sintering temperature used. Although these relatively coarse products have been used in the field of powder metallurgy, the impurity and coarse granular nature of the material has impaired its usefulness. There is, therefore, no direct and commercially practicable method for producing finely divided relatively pure refractory metal compounds of boron and the like without recourse to grinding and milling operations.

An object, therefore, of the present invention is to provide an improved method for making refractory metal compounds of boron which is economical, which may be carried out at relatively low temperatures and which is productive directly of a relatively pure finely divided product.

A further object of the invention is to provide a superior method for forming a mixture of carbon and a refractory metal compound wherein the carbon particles are maintained in intimate contact with the refractory metal compound.

A still further object of the invention is to provide substantially pure finely divided particles of titanium boride.

These and other objects will become apparent from the following more complete description of the instant invention.

The term "finely divided" as used herein with reference to the size of the titanium boride particles formed directly by the process of this invention shall be understood to mean that the effective sizes of the particles may vary from 1 to 50 microns.

In its broadest aspects the present invention relates to new and improved compounds of titanium boride; and to an improved method for making said compounds which comprises forming an intimate mixture of a titanium phosphate, carbon, and boric acid, and then heating the mixture in an inert atmosphere at a temperature of from 1100° C. and higher until reaction is completed, generally at about 1600° C., to produce a finely divided titanium boride.

In carrying out the invention it was discovered that the successful production of substantially pure finely divided titanium boride is dependent, in large measure, upon achieving an intimate mixture of the carbon and titanium components. As pointed out above, due to the coarseness of calcined oxides of titanium, as compared to the particle size of lamp black, it is impossible to form and maintain an intimate mixture of calcined titanium dioxide and finely divided carbon. However, the instant invention embraces the discovery that the problem of forming intimate mixtures of titanium and carbon can be effectively solved by providing the titanium component in the form of a titanium phosphate prepared by reacting titania hydrate with phosphoric acid.

The titania hydrate used in carrying out the process of this invention may be titania metahydrate or titania orthohydrate and is preferably an untreated hydrate which occurs as an intermediate product in the production of titanium dioxide pigment and which is generally referred to in the art as "pulp." This untreated titania hydrate, or pulp, comprises particles, i.e. crystalloids or groups of crystalloids, the effective sizes of which may vary from .05 to 0.2 micron. Since the untreated pulp is usually formed by hydrolyzing an acid solution of titaniferous ore, the untreated pulp will contain or be combined with about 10% sulfuric or hydrochloric acid depending on the kind of acid solution used, and although the presence of the acid in the hydrate is not known to have a deleterious effect on the process or product of the invention, it is within the purview of the invention to remove the acid fraction from the hydrate by any of the techniques well known to the art of pigment manufacturing.

In achieving the objects of this invention it was discovered that when finely divided carbon is mixed with a titanium phosphate and boric acid, the particles of carbon are not only thoroughly and completely dispersed throughout the mixture but that the fine particle sizes greatly enhance the reactivity thereof such that when dried, the mixture may be calcined at relatively low temperatures to produce a substantially pure finely divided titanium boride.

With respect to the carbon used in the mixture of materials, a finely divided carbon, such as lamp black or oil burner soot, is suitable, the unit particles of which have an effective size of from about .01 to .05 micron. It is also within the purview of the invention to use a hydrophilic carbon, that is to say a carbon which has been treated with a suitable wetting agent, as for example one of the polyethylene glycol type, to insure dispersion of the carbon particles in an aqueous medium; or a wetting agent may be added to the admixed titanium phosphate carbon and boric acid.

In carrying out the process of this invention for the preparation of titanium boride, the carbon and boric acid may be admixed with the titanium phosphate in either of two ways. One way is to form the titanium phosphate first by mixing an aqueous slurry of titania hydrate with phosphoric acid in substantially stoichiometric amounts, partially drying the mixture and then heating the dried mixture to form the pyrophosphate having the formula $TiP_2O_7$.

The pyrophosphate is recovered in the form of a dry fine powder to which is added the stoichiometric amounts of dry carbon and an oxidic compound of boron to convert substantially all of the titanium values in the mixture to titanium boride. After thoroughly mixing the dry powders in a mortar or other suitable means, the mixture is transferred directly to calcining means, such as for example an induction furnace or a rotating kiln capable of maintaining the temperatures required for calcining the powdered material. The material is calcined at temperatures of from about 1100° C. to as high as about 1600° C. for from about 2 to 4 hours. Since it is essential to the production of a relatively pure product that the calcining treatment be carried out in an inert atmosphere, an atmosphere of argon is maintained within the calcining means throughout the calcination of the powdered material.

The oxidic compound of boron may be added as boric oxide or preferably as boric acid powder.

The reaction between the titanium pyrophosphate, carbon and boric acid during calcination may be represented by the following equation:

$$TiP_2O_7 + B_2O_3 + 10C = TiB_2 + 10CO + 2P$$

wherein 1 mol of titanium dioxide added in the form of titanium pyrophosphate reacts with 1 mol of boron oxide added in the form of boric acid and 10 mols of carbon to produce 1 mol of titanium boride, 10 mols of carbon monoxide and 2 mols of phosphorus. The latter may be recovered, converted to phosphoric acid and recycled, thereby insuring an efficient and highly economical operation.

Since boric acid is somewhat volatile with water vapor, it is desirable to add substantially 10% or higher excess boric acid over the theoretical amount, any excess boric acid being effectively removed by simple washing of the calcined product.

As an alternative method of mixing the carbon, boron and titanium values, a predetermined amount of carbon, preferably a hydrophilic carbon, which is miscible in an aqueous medium, is added to a mixture of phosphoric acid and aqueous titania hydrate slurry and the ingredients thoroughly mixed by agitation after which the mixture may be partially dried by heating at relatively low temperatures, as for example from 150 to 250° C. The dry or partially dried mixture is then broken up to provide a fine powder to which boric acid is added and the admixture calcined in the manner hereinabove described to form titanium boride.

The calcined product is a finely divided powder of high purity, the unit particles comprising from 67% to 68% titanium and from 29% to 31% boron as compared to the theoretical amounts of 69% and 31% respectively for pure titanium boride. The crystalline structure of the unit particles comprises essentially substantially hexagonal plates of from 3 to 15 microns size. When higher calcining temperatures are used, the calcining time is decreased and the effective size of the particles may be less than 5 microns.

To further illustrate the invention, the following example is given:

*Example I*

To 22 parts titanium pyrophosphate prepared from an admixture of titania hydrate and phosphoric acid and 12 parts carbon black was added 12.4 parts by weight of boric acid powder. The mixture was thoroughly worked for a sufficient length of time to form an intimate mixture of the materials whereupon the mixture was introduced into an induction furnace and calcined at a temperature of about 1500° C. for 2 hours in an atmosphere of argon.

The resulting product comprmised a finely divided powder which analyzed 68% titanium and 30% boron and had an effective particle size of from 1 to 5 microns.

In accordance with the improved process of this invention, metalloids of refractory metals and in particular titanium metalloids of boron may be produced in an efficient and economical manner and from relatively inexpensive source materials. Moreover, the temperatures employed are relatively low, thereby precluding sintering and the formation of relatively large size particles, the calcining temperature for titanium boride being from about 1100° C. to about 1500° C. Further, the finely divided product of this invention has an effective particle size ranging from 1 to 50 microns, but mostly of from 1 to 15 microns, is quite free of free carbon, occluded graphite or other foreign materials and hence is ideally suited for use in powder metallurgy, as abrasives, and in the production of cutting tool alloys and high temperature resistant alloys suitable for use in the manufacture of gas turbine blades.

While this invention has been described and illustrated by the examples shown, it is not intended to be strictly limited thereto, and other variations and modifications may be employed within the scope of the following claims.

I claim:

1. Method for the production of finely divided titanium boride which comprises: forming an intimate mixture of titanium pyrophosphate, carbon and an oxidic compound of boron; said titanium pyrophosphate, carbon and an oxidic compound of boron being present in at least stoichiometric amounts in said mixture; and heating said mixture at a temperature of from about 1100° C. to about 1600° C. in an atmosphere of argon to calcine said mixture and produce titanium boride having a particle size from about 1 micron to about 50 microns.

2. Method for the production of finely divided titanium boride which comprises admixing an aqueous titania hydrate slurry with phosphoric acid to form titanium pyrophosphate, admixing at least stoichiometric amounts of an oxidic compound of boron and finely divided carbon with said titanium pyrophosphate, and then heating said mixture at a temperature sufficient to complete the reaction between said materials, and in an atmosphere of argon to calcine said mixture and produce titanium boride having a particle size from about 1 micron to about 50 microns.

References Cited in the file of this patent

FOREIGN PATENTS 14,124 of 1900     Great Britain _____ Nov. 17, 1900

OTHER REFERENCES

Thorne et al.: "Fritz Ephraim Inorganic Chemistry," 4th edition, 1943, page 849.

Barksdale: "Titanium," 1949, page 87.